Dec. 21, 1965 T. F. BUDDENHAGEN 3,225,346

BINARY INPUT SERVOMECHANISM

Filed Oct. 16, 1961 2 Sheets-Sheet 1

INVENTOR.
THEODORE F. BUDDENHAGEN
BY
Beau, Brooks, Buckley & Beau.
ATTORNEYS

Dec. 21, 1965 T. F. BUDDENHAGEN 3,225,346

BINARY INPUT SERVOMECHANISM

Filed Oct. 16, 1961 2 Sheets-Sheet 2

INVENTOR.
THEODORE F. BUDDENHAGEN
BY
Beau, Brooks, Buckley & Beau.

United States Patent Office 3,225,346
Patented Dec. 21, 1965

3,225,346

BINARY INPUT SERVOMECHANISM

Theodore F. Buddenhagen, Williamsville, N.Y., assignor to Bell Aerospace Corporation, Wheatfield, N.Y.

Filed Oct. 16, 1961, Ser. No. 145,312
13 Claims. (Cl. 340—347)

This invention relates to improvements in servo-mechanisms and pertains, more particularly, to means for controlling a hydraulic mechanism with signals derived from a digital computer.

Although it is appreciated that methods are known for controlling hydraulic actuators with signals derived from a digital computer, such methods employ an electrical digital-to-analog converter whose output is proportional to the binary signal from the digital computer. The output thus obtained is amplified by suitable electronic means and then applied to the servomechanisms. It is of primary concern in connection with this invention to provide control means for a hydraulic servomechanism which eliminates the aforesaid electronic amplifier means and portions of the aforesaid digital-to-analog converter.

More specifically, it is an object of this invention to provide a hydraulic servomechanism and associated control mechanism therefor which is capable of converting a binary command to an analog function such as actuator position, fluid flow rate or applied load differential pressure. In the present invention, such objective is achieved by the use of a deflection responsive control member for the servomechanism whose position is controlled by any one or a combination of electrical coil members, each of which is individually associated with a different channel of a multiple bit binary input means. Thus, if the coil members each operate to effect a deflection different from any of the others individually, the servomechanism will convert the binary command to an analog function.

Figure 1:
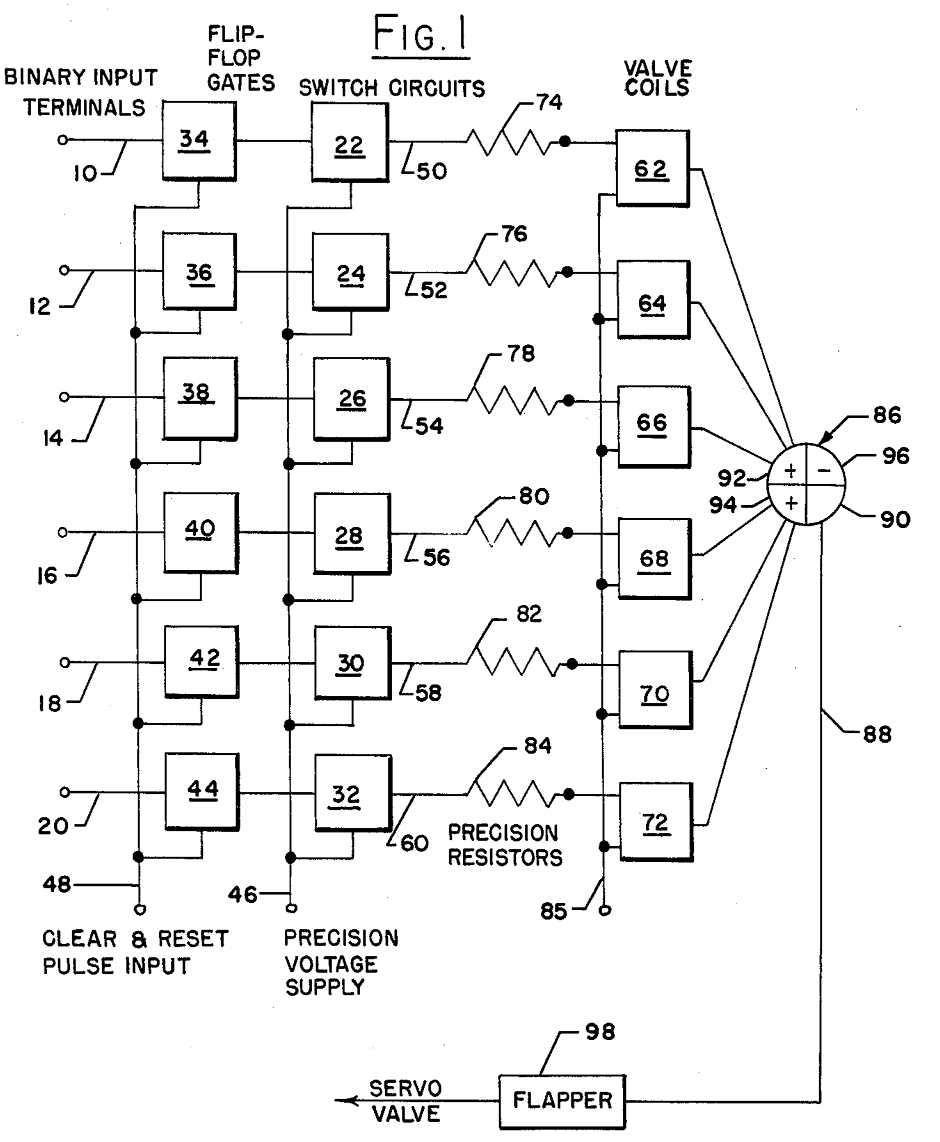
Figure 2:
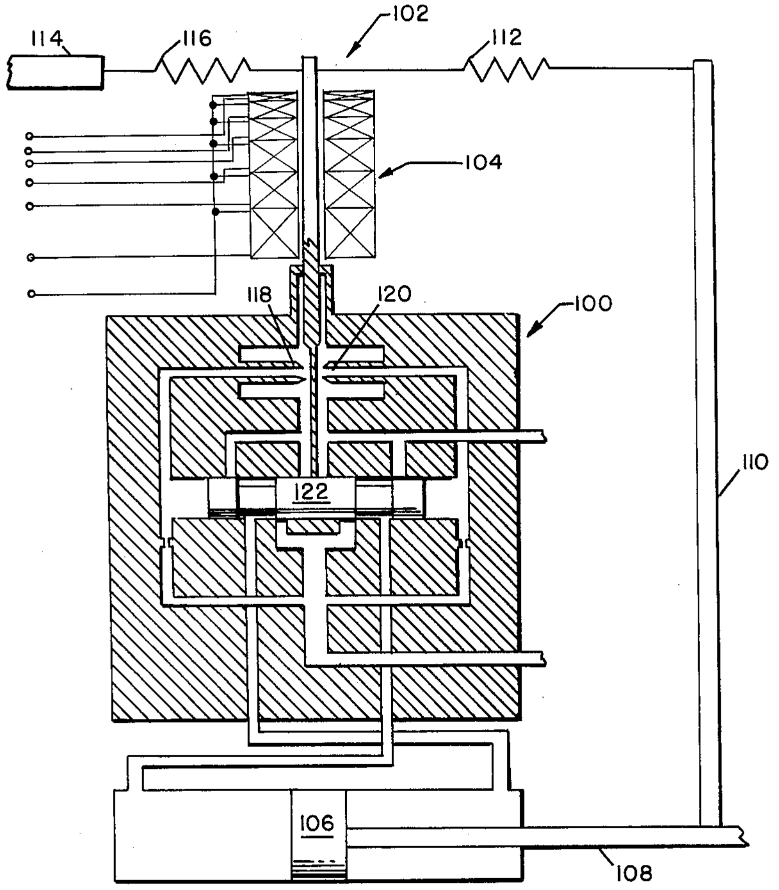

Other objects and advantages of the invention will appear from the description hereinbelow and the accompanying drawings wherein:

FIG. 1 is a diagrammatic view of the system according to the present invention; and FIG. 2 is a sectional view taken through a servomechanism which may form part of the present system.

Referring now to FIG. 1, a multiple bit binary input or command is represented by leads 10, 12, 14, 16, 18 and 20, each of which provides a binary bit channel. In the specific example shown, channel 10 represents a value of $2^0=1$, channel 12 represents a value of $2^1=2$ and so on for as many channels as are represented, the last of which has a value of $2^{n-1}$, corresponding in the specific example to $5^5=32$. Thus, with the specific system, the highest value represented is 63, which corresponds to the sum of all channels.

The voltages applied over the various channels are derived from a suitable digital computer, itself forming no part of the present invention, and may, for example, be in accord with functions associated with a missile or aircraft flight control system, or the like.

The voltages at the various leads or channels are utilized to control a bank of switch means 22, 24, 26, 28, 30 and 32, each of which is operative to introduce a control voltage into the system in a manner corresponding to the binary command through the various channels. To accomplish this, the individual channels contain "on"-"off" devices 34, 36, 38, 40, 42 and 44 which may take the form of conventional flip-flop gates. The various gates constitute a data register which is set by the binary signals from the digital computer and, in turn, actuate the corresponding switch means. Both the gates and the switch means utilize semi-conductors and form, per se, no part of the present invention since they may take conventional form. It is to be understood, however, that the switch means may be constructed for either unipolar or bi-polar operation which, normally, would dictate the use of one or two transistors, respectively.

The switch means are operative to introduce the supply voltage designated by lead 46 which, as shown, may be connected in common to all of the switch means. The gates may be connected in common to clear and reset means as illustrated by the common lead 48. Pulses applied over lead 48 may be used to periodically reset the flip-flop gates to update their settings as the binary input changes.

The supply voltage is impressed upon the leads 50, 52, 54, 56, 58 and 60 in accord with the actuation of the corresponding switch means and this, in turn actuates the servomechanism in analog fashion. This may be accomplished either by providing a series of electrical coils 62, 64, 66, 68, 70 and 72 having a like number of turns and associated resistors 74, 76, 78, 80, 82 and 84 of varying resistance, or the resistors may be of like value while the coils are of varying number of turns. In any event, the coils and their associated resistors provide a torque motor associated with the servomechanism, in which the individual coils are effective to produce a torque corresponding to the binary command inputs thereto. For example, the torque exerted by coil 62 would be T whereas the torque of coil 64 would be 2T, corresponding respectively to the binary bit values of $2^0=1$ and $2^1=2$ which are correct for leads or channels 10 and 12 respectively. In this fashion, the torque of the last coil would be $2^{(n-1)}$T, or 32T for coil 72. The coils are of course provided with suitable ground connection such as is indicated by the common ground lead 85.

As shown in FIG. 1, the torque outputs of the several coils are depicted diagrammatically by lines extending to the summing circle 86 with the summation of all torques being shown by the single output line 88 extending from the output quadrant 90. It is to be noted that the two quadrants 92 and 94 which are employed to designate the summation of coil torques, are both marked "+" whereas the remaining quadrant 96 is marked "—." It will be understood that such markings are used only in a relative sense, that is to illustrate that feedback torque may be used when desired. Feedback torque, hereinafter more particularly described, would be in opposition to the torque sum effected by the coils.

In any event, the torque sum 88 is applied to the control member 98 of a hydraulic actuator mechanism to cause physical displacement of the control member in accord with the binary command. Thus, the system as described may be used, for example, to effect control member movement of hydraulic mechanisms such as those of the following United States Patents:

| | | |
|---|---|---|
| 2,950,703 | 2,886,009 | 2,655,939 |
| 2,947,286 | 2,877,742 | 2,613,890 |
| 2,947,285 | 2,823,689 | 2,441,263 |
| 2,933,269 | 2,797,666 | 2,767,689 |
| 2,926,696 | 2,771,062 | Re. 21,770 |
| | 2,690,192 | |

FIG. 2 illustrates the torque motor as described above in conjunction with hydraulic mechanism according to United States Patent 2,947,286. The hydraulic mechanism is indicated generally by reference character 100 and includes the flapper valve 102 with which the above described torque motor is associated, as indicated at 104. Movement of the flapper valve is effective to cause movement of piston 106 and piston rod 108 which may extend for example, to a control surface of an aircraft or the like. A bar 110, fixed to the piston rod 108 is connected to the flapper valve 102 by means of a feedback spring 112. A mechanical actuator 114 may be used, through spring connection 116, to provide means distinct from the torque motor 104 for moving the flapper valve.

The mechanism 114 and 116 may or may not be used and likewise, the feedback mechanism may be omitted. The function of the feedback mechanism is, however, to provide an opposing torque to the torque applied by the motor 104 and would, therefore be indicated in FIG. 1 by an input line to the quadrant 96. In this fashion, the torque exerted by the torque motor causing deflection of the flapper 102 is initially reacted by the sum of the torques on the flapper 102 (by impingement of hydraulic fluid thereon from nozzles 118 and 120) and by the initial deformation force exerted by the feedback spring 112. As the piston 106 moves, moving bar 110 with it, the force exerted by the feedback spring 112 is increased until the steady state condition is reached in which the torque exerted by the coils is reacted entirely by the feedback torque, thus causing the position of the piston rod to be in correspondence with the binary input. That is to say, whenever the electromagnetic torque is not fully reacted by the feedback torque, the remainder is reacted by a differential pressure at the nozzles 118 and 120. This situation prevails until the steady state condition is reached at which time the spool valve 122 becomes centered and actuator motion ceases.

The same torque motor may be used with torque feedback derived from other functions in lieu of actuator rod position. For example, torque feedback may be derived from spool valve position, hydraulic fluid flow rate, or differential pressure. Also, the feedback torque may be dispensed with if desired. The device is therefore capable of converting the binary input into actuator position, velocity, force or combinations thereof, both statically and dynamically.

It is to be understood that certain changes and modifications as illustrated and described may be made without departing from the spirit of the invention or the scope of the following claims:

I claim:

1. A binary input servomechanism comprising a servo member having an actuator, a control member for effecting movement of said actuator and a torque motor for actuating said control member, said torque motor comprising a plurality of coil means for effecting different torques upon said control member in response to individual and combinational operation of said coil means, and means adapted for connection to a digital computer to operate said individual coil means selectively in accord with binary command input.

2. In the assembly as defined in claim 1 wherein each coil means comprises a coil and a resistor for controlling the current flow therethrough, all such coils having a like number of turns and each of the resistors having a resistance value different from the others and in ratio thereto according to the binary input to that particular resistor.

3. In the assembly as defined in claim 1 wherein each coil means comprises a coil and a resistor for controlling the current flow therethrough, each coil having a number of turns different from the number of turns of any of the others to effect a torque proportional to the binary input thereto.

4. A binary input servomechanism comprising data register means adapted to be connected to a digital computer, a plurality of switch means controlled by said data register means, and a servomechanism, said servomechanism including a torque motor in the form of a plurality of coil means connected to individual ones of said switch means.

5. A binary input servomechanism comprising data register means in the form of a bank of flip-flop gates adapted to be set by binary bits from a digital computer, switch means connected to each gate and controlled thereby, and a servomechanism, said servomechanism including a torque motor for controlling the output of the mechanism, said torque motor having a plurality of separate coils, each connected to a different one of said switch means.

6. In the assembly as defined in claim 4 wherein each coil means comprises a coil and a resistor for controlling the current flow therethrough, all such coils having a like number of turns and each of the resistors having a resistance value different from the others and in ratio thereto according to the binary input to that particular resistor.

7. In the assembly as defined in claim 4 wherein each coil means comprises a coil and a resistor for controlling the current flow therethrough, each coil having a number of turns different from the number of turns of any of the others to effect a torque proportional to the binary input thereto.

8. In the assembly as defined in claim 5 wherein each coil means comprises a coil and a resistor for controlling the current flow therethrough, all such coils having a like number of turns and each of the resistors having a resistance value different from the others and in ratio thereto according to the binary input to that particular resistor.

9. In the assembly as defined in claim 5 wherein each coil means comprises a coil and a resistor for controlling the current flow therethrough, each coil having a number of turns different from the number of turns of any of the others to effect a torque proportional to the binary input thereto.

10. A binary input servomechanism, comprising data register means for receiving binary input, a plurality of normally "off" switch means controlled by said data register means, mechanism having an actuator and a control member therefor, a torque motor associated with said control member for effecting movement of said actuator, said torque motor including a plurality of individual coil means, said coil means being individually connected to said normally "off" switch means.

11. The assembly as defined in claim 10 wherein said actuator is provided with a resilient means opposing movement of said control member.

12. In the assembly as defined in claim 10 wherein each coil means comprises a coil and a resistor for controlling the current flow therethrough, each coil having a number of turns different from the number of turns of any of the others to effect a torque proportional to the binary input thereto.

13. In the assembly as defined in claim 10 wherein each coil means comprises a coil and a resistor for controlling the current flow therethrough, all such coils having a like number of turns and each of the resistors having a resistance value different from the others and in ratio thereto according to the binary input to that particular resistor.

References Cited by the Examiner

UNITED STATES PATENTS

| | | | |
|---|---|---|---|
| 2,947,286 | 8/1960 | Baltus et al. | 137—82 X |
| 2,950,472 | 8/1960 | Rowley | 340—347 |
| 2,993,202 | 7/1961 | Halonen | 340—347 |

MALCOLM A. MORRISON, *Primary Examiner.*

KARL J. ALBRECHT, NATHAN KAUFMAN, *Examiners.*

R. G. NILSON, E. T. REICHERT, L. W. MASSEY, K. R. STEVENS, *Assistant Examiners.*